(12) United States Patent
Li et al.

(10) Patent No.: US 11,036,670 B2
(45) Date of Patent: Jun. 15, 2021

(54) ELECTRONIC DEVICE HAVING USB TYPE-C INTERFACE, CONTROL METHOD, AND READABLE STORAGE

(71) Applicant: Huawei Technologies Co., Ltd., Shenzhen (CN)

(72) Inventors: Junjie Li, Shanghai (CN); Le Cong, Shanghai (CN); Hongjun Zhao, Shanghai (CN); Xuan Dai, Shanghai (CN)

(73) Assignee: HUAWEI TECHNOLGIES CO., LTD., Shenzhen (CN)

( * ) Notice: Subject to any disclaimer, the term of this patent is extended or adjusted under 35 U.S.C. 154(b) by 0 days.

(21) Appl. No.: 16/759,968

(22) PCT Filed: Oct. 31, 2017

(86) PCT No.: PCT/CN2017/108755
§ 371 (c)(1),
(2) Date: Apr. 28, 2020

(87) PCT Pub. No.: WO2019/084824
PCT Pub. Date: May 9, 2019

(65) Prior Publication Data
US 2020/0278945 A1    Sep. 3, 2020

(51) Int. Cl.
*G06F 13/42* (2006.01)
*G06F 1/26* (2006.01)
*G06F 1/28* (2006.01)

(52) U.S. Cl.
CPC ............ *G06F 13/4282* (2013.01); *G06F 1/28* (2013.01); *G06F 1/26* (2013.01); *G06F 2213/0042* (2013.01)

(58) Field of Classification Search
CPC . G06F 13/4282; G06F 2213/0042; G06F 1/26
See application file for complete search history.

(56) References Cited

U.S. PATENT DOCUMENTS 9,812,876 B2 * 11/2017 Lin ..................... H02J 7/00047
2014/0218045 A1   8/2014 Shoykhet et al.
(Continued)

FOREIGN PATENT DOCUMENTS

CN    105068958 A    11/2015
CN    105630724 A     6/2016
(Continued)

*Primary Examiner* — Zachary K Huson
(74) *Attorney, Agent, or Firm* — Slater Matsil, LLP

(57) ABSTRACT

A electronic device includes a USB Type-C interface, a switching circuit, a first signal path, and a second signal path. The USB Type-C interface is configured to connect to a USB Type-C device. The switching circuit is connected to the USB Type-C interface, the first signal path, and the second signal path. When the USB Type-C interface is connected to the USB Type-C device, the first signal path is connected to the USB Type-C interface through the switching circuit, and a level of a first pin of the USB Type-C interface is a first level. When the USB Type-C interface is disconnected from the USB Type-C device, the second signal path is connected to the USB Type-C interface through the switching circuit, and a level of the first pin is a second level. The first level is greater than the second level.

20 Claims, 10 Drawing Sheets

(56) References Cited

U.S. PATENT DOCUMENTS

| | | | |
|---|---|---|---|
| 2016/0062935 A1 | 3/2016 | Talmola | |
| 2017/0110835 A1 | 4/2017 | Hasegawa et al. | |
| 2017/0124010 A1* | 5/2017 | Whitby-Strevens | ........................ G06F 13/385 |
| 2017/0147526 A1 | 5/2017 | Chen et al. | |
| 2017/0177053 A1 | 6/2017 | Browning et al. | |
| 2018/0062381 A1* | 3/2018 | Jarvensivu | ......... H01R 13/6683 |
| 2018/0181509 A1* | 6/2018 | Jo | .......................... G01N 27/06 |
| 2019/0312448 A1* | 10/2019 | Lim | ..................... H02J 7/0027 |
| 2019/0369708 A1* | 12/2019 | K | ............................ H02J 9/005 |

FOREIGN PATENT DOCUMENTS

| | | |
|---|---|---|
| CN | 105656162 A | 6/2016 |
| CN | 105867593 A | 8/2016 |
| CN | 105929922 A | 9/2016 |
| CN | 106020176 A | 10/2016 |
| CN | 106104506 A | 11/2016 |
| CN | 106201951 A | 12/2016 |
| CN | 106445858 A | 2/2017 |
| CN | 106598818 A | 4/2017 |
| CN | 107277416 A | 10/2017 |
| EP | 2930588 A1 | 10/2015 |

* cited by examiner

ELECTRONIC DEVICE HAVING USB TYPE-C INTERFACE, CONTROL METHOD, AND READABLE STORAGE

CROSS-REFERENCE TO RELATED APPLICATIONS

This application is a National Stage of International Application No. PCT/CN2017/108755, filed on Oct. 31, 2017, which is hereby incorporated by reference in its entirety.

TECHNICAL FIELD

This application relates to the field of USB Type-C interface technologies, and in particular, to an electronic device having a USB Type-C interface, a control method, and a readable storage medium.

BACKGROUND

With popularization of a universal serial bus (Universal Serial Bus, USB) technology, a personal computer (personal computer, PC) may be connected to a terminal within a connection range through a data cable, and the data cable is used by the PC to control a data transmission process, that is, data transmission between the PC and different terminals. However, in this convenient switching manner, once the terminals leave the PC, operations cannot be performed between the terminals through a USB interface, because none of the terminals can act as a PC-like host. However, with further development of communications technologies, an OTG (ON-THE-GO) technology can implement data transmission between terminals without a PC. For example, a USB interface of a digital camera is connected to a USB interface of a printer through the OTG technology, and then a photo taken with the digital camera is printed from the printer.

In actual use, an implementation of an OTG function needs to be supported by the PD (POWER DELIVERY) protocol of the USB Type-C interface, and the PD protocol requires a CC pin (Configuration Channel PIN) of the USB Type-C interface to be energized even in a standby state. However, once liquid flows into the energized Type-C interface, electrolysis occurs, and the USB Type-C port is corroded. Once corrosion is severe, not only a service life of a terminal is shortened, but also use of a user is affected.

SUMMARY

This application provides an electronic device having a USB Type-C interface, a control method, and a readable storage medium, to resolve a problem that the USB Type-C interface is severely corroded when the electronic device is in a standby state.

According to a first aspect, an embodiment of the present invention provides an electronic device having a USB Type-C interface. The electronic device includes the USB Type-C interface, a switching circuit, a first signal path, and a second signal path. The USB Type-C interface is configured to connect to a USB Type-C device. The switching circuit is connected to the USB Type-C interface; the switching circuit is connected to the first signal path; and the switching circuit is connected to the second signal path. When the USB Type-C interface is connected to the USB Type-C device, the first signal path is connected to the USB Type-C interface through the switching circuit, and a level of a first pin of the USB Type-C interface is a first level. When the USB Type-C interface is disconnected from the USB Type-C device, the second signal path is connected to the USB Type-C interface through the switching circuit, and a level of the first pin of the USB Type-C interface is a second level. The first level is greater than the second level. It can be learned that, when the electronic device is not connected to the USB Type-C device, the first signal path is not connected to the USB Type-C interface, but the second signal path is connected to the USB Type-C interface. In this case, the level of the first pin of the USB Type-C interface is the second level, which is less than the first level of the first pin of the USB Type-C interface when the electronic device is connected to the USB Type-C device. In this way, it can be ensured that when the electronic device is not connected to the USB Type-C device, a voltage of the USB Type-C interface becomes lower, thereby reducing corrosion of the USB Type-C interface when the electronic device is in a standby state. Therefore, a problem of severe corrosion is resolved.

In a possible design, the first pin of the USB Type-C interface is a CC pin.

In a possible design, the first signal path includes a PD circuit, and the second signal path includes a power supply module, a detection module, and a first resistor. The power supply module is configured to output first power, and is connected to a third pin of the switching circuit through the first resistor. A level of the first power is less than a level of a signal output by the PD circuit. The detection module is configured to detect a level of the third pin of the switching circuit, and when the level of the third pin meets a first preset condition, determine that the USB Type-C interface is connected to the USB Type-C device, and send a first signal to the switching circuit, so that the first signal path is connected to the USB Type-C interface. After the detection module detects that the second level changes greatly, it may be determined that the USB Type-C interface is currently connected to the USB Type-C device. In this case, to enable a PD circuit to identify a type of the USB Type-C device through the USB Type-C interface, the switching circuit needs to be controlled to disconnect the first pin of the switching circuit from the third pin of the switching circuit, and connect the first pin of the switching circuit to a second pin of the switching circuit.

In a possible design, the PD circuit is configured to detect a level of the second pin of the switching circuit, and when the level of the second pin meets a second preset condition, determine that the USB Type-C interface is disconnected from the USB Type-C device, and send a second signal to the switching circuit, so that the second signal path is connected to the USB Type-C interface. After the PD circuit detects that the first level changes greatly, it may be determined that the USB Type-C device currently connected to the USB Type-C interface is disconnected. In this case, to reduce the corrosion of the USB Type-C interface, the switching circuit needs to be controlled to disconnect the first pin of the switching circuit from the second pin of the switching circuit, and connect the first pin of the switching circuit to the third pin of the switching circuit.

In a possible design, a value of the first resistor used as a voltage divider resistor may be in a kilo-ohm (Kohm) magnitude or a mega-ohm (Mohm) magnitude. This is not limited herein. In addition, after the USB Type-C interface is connected to the USB Type-C device, and the first pin of the switching circuit is connected to the third pin of the switching circuit, a larger value of the first resistor indicates a smaller value of a voltage between the first resistor and the third pin of the switching circuit, and also means a smaller level of the third pin of the switching circuit, namely a smaller CC_Detect voltage value, which is closer to 0.

In a possible design, the electronic device further includes a controller. The controller is connected to the detection module and the switching circuit. The detection module is further configured to send the first signal to the controller when the detected level of the third pin of the switching circuit meets the first preset condition. The controller instructs, based on the first signal, the first pin of the switching circuit to connect to the second pin of the switching circuit. It can be learned that the controller can instruct, based on the first signal sent by the detection module, the switching circuit to implement connection switching between pins. In addition, the detection module can not only detect a change of a level, but also implement determining between the level and the first preset condition. Finally, only a determining result needs to be sendred to the switching circuit for execution by the switching circuit.

In a possible design, the first preset condition is used to determine whether the detection module needs to send the first signal to the controller, and includes but is not limited to at least one of the following: a level decrease value of the third pin of the switching circuit is greater than a first voltage threshold; and the level of the third pin of the switching circuit is less than a second voltage threshold, or falls within a preset threshold range. In this embodiment of the present invention, values of the first voltage threshold and the second voltage threshold, and upper and lower limits of the preset threshold range may be set based on historical empirical values. A setting manner, a specified value, and the like are not limited herein.

In a possible design, the electronic device further includes a controller. The controller is connected to the detection module and the switching circuit. The detection module sends the detected level of the third pin of the switching circuit to the controller. The controller instructs, based on the level of the third pin of the switching circuit, the first pin of the switching circuit to connect to the second pin of the switching circuit. It can be learned that, the controller can determine, based on a level sent by the detection module, whether the switching circuit needs to be instructed to implement connection switching between the pins, and then send a determining result to the switching circuit for execution by the switching circuit.

In a possible design, the detection module is an analog-to-digital converter ADC detection module.

In a possible design, that the PD circuit detects that the USB Type-C device connected to the USB Type-C interface is disconnected includes but is not limited to: the PD circuit detects that a voltage between the PD circuit and the second pin of the switching circuit meets the second preset condition.

In a possible design, the second preset condition includes but is not limited to at least one of the following: the level of the second pin of the switching circuit increases or decreases, and a change value is greater than a third voltage threshold; the level of the second pin of the switching circuit is greater than a fourth voltage threshold; and the level of the second pin of the switching circuit is less than a fifth voltage threshold. The fourth voltage threshold is greater than the fifth voltage threshold. Values of the third voltage threshold, the fourth voltage threshold, and the fifth voltage threshold may be set based on historical empirical values. A setting manner and a specified value are not limited herein.

According to a second aspect, an embodiment of the present invention provides a control method for controlling a USB Type-C interface, applied to an electronic device having a USB Type-C interface. The electronic device further includes a switching circuit, a first signal path, and a second signal path. The USB Type-C interface is configured to connect to a USB Type-C device. The switching circuit is connected to the USB Type-C interface; the switching circuit is connected to the first signal path and the switching circuit is connected to the second signal path. The method includes: when the USB Type-C interface is connected to the USB Type-C device, connecting the first signal path to the USB Type-C interface through the switching circuit, where a level of a first pin of the USB Type-C interface is a first level; when the USB Type-C interface is disconnected from the USB Type-C device, connecting the second signal path to the USB Type-C interface through the switching circuit, where a level of the first pin of the USB Type-C interface is a second level. The first level is greater than the second level. Based on a same inventive concept, for a problem-resolving principle and beneficial effects of the method, refer to the first aspect, the possible method implementations of the first aspect, and the brought beneficial effects. Therefore, for implementation of the method, refer to the first aspect and the possible method implementations of the first aspect. No repeated description is provided.

According to a third aspect, an embodiment of the present invention provides an electronic device having a USB Type-C interface. The electronic device further includes a switching circuit, a first signal path, and a second signal path. The USB Type-C interface is configured to connect to a USB Type-C device. A first pin of the switching circuit is connected to a first pin of the USB Type-C interface. A second pin of the switching circuit is connected to the first signal path. A third pin of the switching circuit is connected to the second signal path. The electronic device further includes a memory, and a processor, and the memory stores an instruction. The processor invokes the instruction stored in the memory, to implement the solution in the method design of the second aspect. For a problem-resolving implementation and beneficial effects of the electronic device, refer to the second aspect and beneficial effects thereof. Therefore, for implementation of the electronic device, refer to the implementation of the method. No repeated description is provided.

According to a fourth aspect, an embodiment of the present invention provides a readable storage medium. The readable storage medium stores an instruction, and when the instruction is run on an electronic device, the electronic device is enabled to perform the method shown in the second aspect and the possible designs of the second aspect.

REFERENCE NUMERALS

200: electronic device;
201: USB Type-C interface of the electronic device;
201a: first pin of the USB Type-C interface of the electronic device;
201b: second pin of the USB Type-C interface of the electronic device;
202: switching circuit;
202a: first pin of the switching circuit;
202b: second pin of the switching circuit;
202c: third pin of the switching circuit;
202d: switch;
202e: switch;
203: first signal path;
203a: PD circuit;
204: second signal path;
204a: power supply module;
204b: detection module;
204c: first resistor;
205: USB Type-C device;
205a: second resistor;
206: controller;
207: USB Type-C interface of the USB Type-C device;
207a: first pin of the USB Type-C interface of the USB Type-C device; and
207b: second pin of the USB Type-C interface of the USB Type-C device.

DETAILED DESCRIPTION OF ILLUSTRATIVE EMBODIMENTS

The following describes the technical solutions in the embodiments of the present invention with reference to the accompanying drawings in the embodiments of the present invention.

Figure 1:
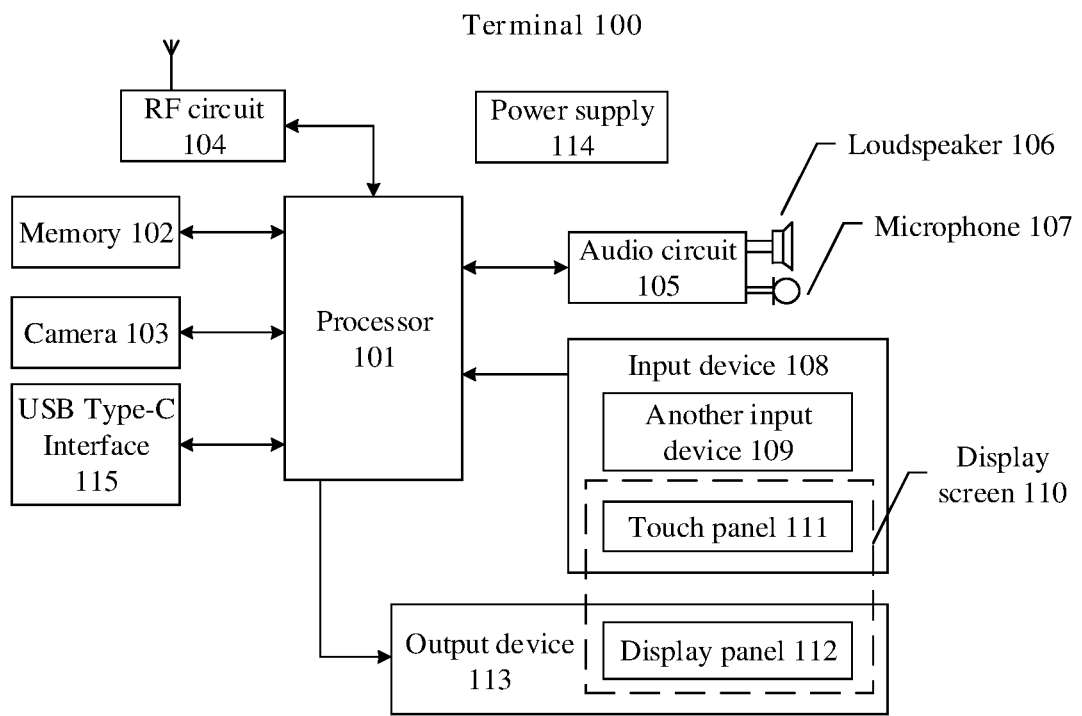
FIG. 1 is a schematic structural diagram of a terminal according to an embodiment of the present invention.

An embodiment of the present invention may be applied to a terminal, and the terminal may include a device such as a notebook computer or a smartphone. At least a camera, a display screen, an input device, and a processor are disposed on the terminal. A terminal 100 is used as an example. As shown in FIG. 1, the terminal 100 includes components such as a processor 101, a memory 102, a camera 103, an RF circuit 104, an audio circuit 105, a loudspeaker 106, a microphone 107, an input device 108, another input device 109, a display screen 110, a touch panel 111, a display panel 112, an output device 113, a power supply 114 and a USB Type-C interface 115. The display screen 110 includes at least the touch panel 111 serving as an input device and the display panel 112 serving as an output device. It should be noted that a structure of the terminal shown in FIG. 1 constitutes no limitation on the terminal, and the terminal may include more or fewer components than those shown in the figure, or combine some components, or split some components, or have different component arrangements. This is not limited herein.

The following describes each composition part of the terminal 100 in detail with reference to FIG. 1.

The radio frequency (Radio Frequency, RF) circuit 104 may be configured to: send and/or receive information or receive and send a signal during a call. For example, if the terminal 100 is a mobile phone, the terminal 100 may send, through the RF circuit 104 after receiving downlink information sent by a base station, the downlink information to the processor 101 for processing, and send related uplink data to the base station. Generally, an RF circuit includes but is not limited to an antenna, at least one amplifier, a transceiver, a coupler, a low noise amplifier (Low Noise Amplifier, LNA), a duplexer, and the like. In addition, the RF circuit 104 may further communicate with a network and another device through wireless communication. The wireless communication may use any communications standard or protocol, including but not limited to a global system for mobile communications (Global System of Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short messaging service (Short Messaging Service, SMS), and the like.

The memory 102 may be configured to store a software program and a module. The processor 101 runs the software program and the module that are stored in the memory 101, to perform various functions and applications of the terminal 100 and process data. The memory 101 may mainly include a program storage area and a data storage area. The program storage area may store an operating system, an application required by at least one function (such as a sound playing function or an image playing function), and the like. The data storage area may store data (such as audio data or video data) created based on use of the terminal 100, and the like. In addition, the memory 101 may include a high-speed random access memory, and may further include a non-volatile memory, such as at least one magnetic disk storage device, a flash memory device, or another volatile solid-state storage device.

The another input device 109 may be configured to receive input digit or character information, and generate a key signal input related to user setting and function control of the terminal 100. Specifically, the another input device 109 may include but is not limited to one or more of a physical keyboard, a function key (such as a volume control key or an on/off key), a tracking ball, a mouse, a joystick, an optical mouse (the optical mouse is a touch-sensitive surface that does not display visual output, or an extension of a touch-sensitive surface formed by a touchscreen), or the like. The another input device 109 may further include a sensor built in the terminal 100, such as a gravity sensor or an acceleration sensor, and the terminal 100 may further use a parameter detected by the sensor as input data.

The display screen 110 may be configured to display information entered by a user or information provided for the user, and various menus of the terminal 100, and may further receive a user input. In addition, the display panel 112 may be configured in a form of a liquid crystal display (Liquid Crystal Display, LCD), an organic light-emitting diode (Organic Light-Emitting Diode, OLED), or the like. The touch panel in, also referred to as a touchscreen, a touch-sensitive screen, or the like, may collect a touch or non-touch operation (for example, an operation performed by the user on the touch panel 111 or near the touch panel 111 through any proper object or accessory, such as a finger or a stylus, or a motion sensing operation may be included, and the operation includes an operation type such as a single-point control operation or a multipoint control operation) performed by the user on or near the touch panel 111, and drive a corresponding connection apparatus based on a preset program. It should be noted that the touch panel 111 may further include two parts: a touch detection apparatus and a touch controller. The touch detection apparatus detects a touch orientation and gesture of the user, detects a signal brought by the touch operation, and sends the signal to the touch controller. The touch controller receives touch information from the touch detection apparatus, converts the touch information into information that can be processed by the processor 101, and then sends the information to the processor 101. In addition, the touch controller can further receive and execute a command sent by the processor 101. In addition, the touch panel 111 may be implemented in a plurality of types, such as a resistive type, a capacitive type, an infrared ray, and a surface acoustic wave, or the touch panel 111 may be implemented through any technology developed in the future. Generally, the touch panel 111 may cover the display panel 112. The user may perform, based on content displayed on the display panel 112 (the displayed content includes but is not limited to a soft keyboard, a virtual mouse, a virtual key, an icon, and the like), an operation on or near the touch panel 111 that covers the display panel 112. After detecting the operation on or near the touch panel in, the touch panel 111 sends the operation to the processor 101 to determine the user input, and then the processor 101 provides corresponding visual output on the display panel 112 based on the user input. In FIG. 1, the touch panel in and the display panel 112 serve as two independent components to implement input and output functions of the terminal 100. However, in some embodiments, the touch panel in and the display panel 112 may be integrated to implement the input and output functions of the terminal 100.

The RF circuit 104, the loudspeaker 106, and the microphone 107 may provide an audio interface between the user and the terminal 100. The audio circuit 105 may convert received audio data into a signal, and transmit the signal to the loudspeaker 106, and the loudspeaker 106 converts the signal into a voice signal for output. In addition, the microphone 107 may convert a collected voice signal into a signal, and the audio circuit 105 receives the signal, converts the signal into audio data, and then outputs the audio data to the RF circuit 104, to send the audio data to a device such as another terminal, or output the audio data to the memory 102, so that the processor 101 performs further processing with reference to content stored in the memory 102. In addition, the camera 103 may collect an image frame in real time and send the image frame to the processor 101 for processing, and store a processed result in the memory 102 and/or display the processed result to the user through the display panel 112.

The processor 101 is a control center of the terminal 100, is connected to each part of the entire terminal 100 through various interfaces and lines, and performs various functions of the terminal 100 and data processing by running or executing the software program and/or the module that are/is stored in the memory 102 and invoking data stored in the memory 102, to perform overall monitoring on the terminal 100. It should be noted that the processor 101 may include one or more processing units. An application processor and a modem processor may be integrated into the processor 101. The application processor mainly processes an operating system, a user interface (User Interface, UI), an application, and the like. The modem processor mainly processes wireless communication. It may be understood that the modem processor may alternatively not be integrated into the processor 101.

The terminal 100 may further include the power supply 114 (for example, a battery) that supplies power to each component. In this embodiment of the present invention, the power supply 114 may be logically connected to the processor 101 through a power management system, to manage functions such as charging, discharging, and power consumption through the power management system.

The USB Type-C interface 115 is configured to connect to a USB Type-C device.

In addition, a component not shown in FIG. 1 also exists. For example, the terminal 100 may further include a Bluetooth module, and the like. Details are not described herein.

Currently, to reduce corrosion of the USB Type-C interface, a new rhodium-ruthenium-palladium alloy plating may be used to replace an original metal copper and nickel plating on the USB Type-C interface. However, a cost of using rhodium-ruthenium palladium alloy is relatively high, which will greatly increase a production cost of the terminal. To resolve the foregoing problem, in this embodiment of the present invention, an original circuit is improved, and circuit switching in different scenarios is implemented by adding a switch. For a specific implementation, refer to the following description.

An embodiment of the present invention provides an electronic device 200 with a USB Type-C interface. The electronic device 200 may be the terminal 100 shown in FIG. 1.

Figure 2:
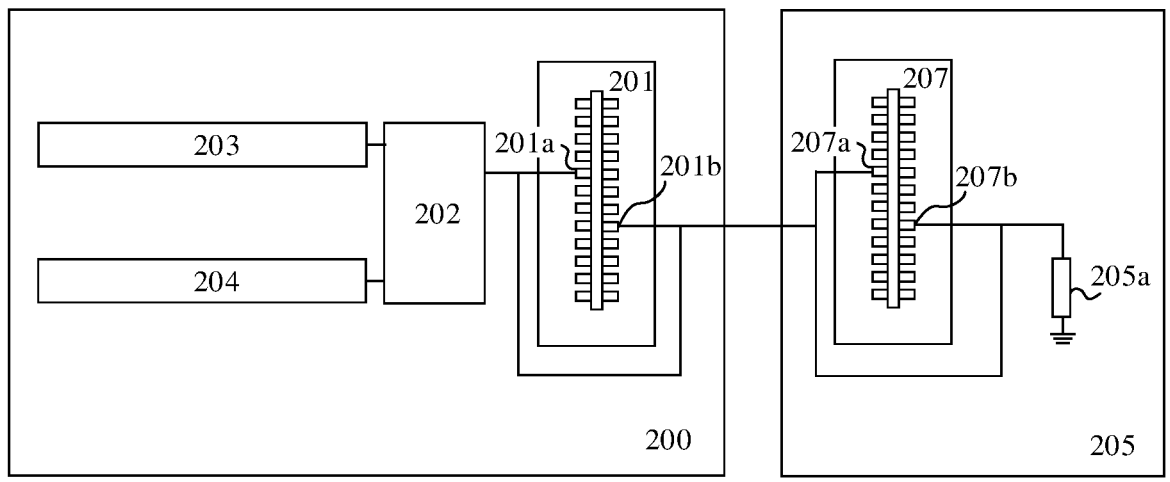
FIG. 2 is a schematic structural diagram of a first circuit according to an embodiment of the present invention.

FIG. 2 is a schematic structural diagram of a first circuit that may be applied to the terminal 100 shown in FIG. 1. As shown in FIG. 2, the electronic device 200 includes a first signal path 203, a second signal path 204, a switching circuit 202, and a USB Type-C interface 201. The switching circuit 202 is connected to the USB Type-C interface 201, and is connected to a USB Type-C device 205 through a USB Type-C interface 207.

In this embodiment of the present invention, when the USB Type-C interface 201 is connected to the USB Type-C device 205, the first signal path 203 is connected to the USB Type-C interface 201 through the switching circuit 202. In this case, a level of a first pin 202a (refer to FIG. 2) of the USB Type-C interface 201 is a first level. When the USB Type-C interface 201 is disconnected from the USB Type-C device 205, the second signal path 204 is connected to the USB Type-C interface 201 through the switching circuit 202. In this case, a level of the first pin 202a of the USB Type-C interface 201 is a second level. The first level is greater than the second level.

It can be learned that the switching circuit 202 may select different signal paths in different cases to connect to the USB Type-C interface 201. To be specific, after the electronic device 200 is connected to the USB Type-C device 205, the first signal path is connected to the USB Type-C device 205; and after the electronic device 200 is disconnected from the USB Type-C device 205, the second signal path is connected to the USB Type-C interface 201.

Figure 3:
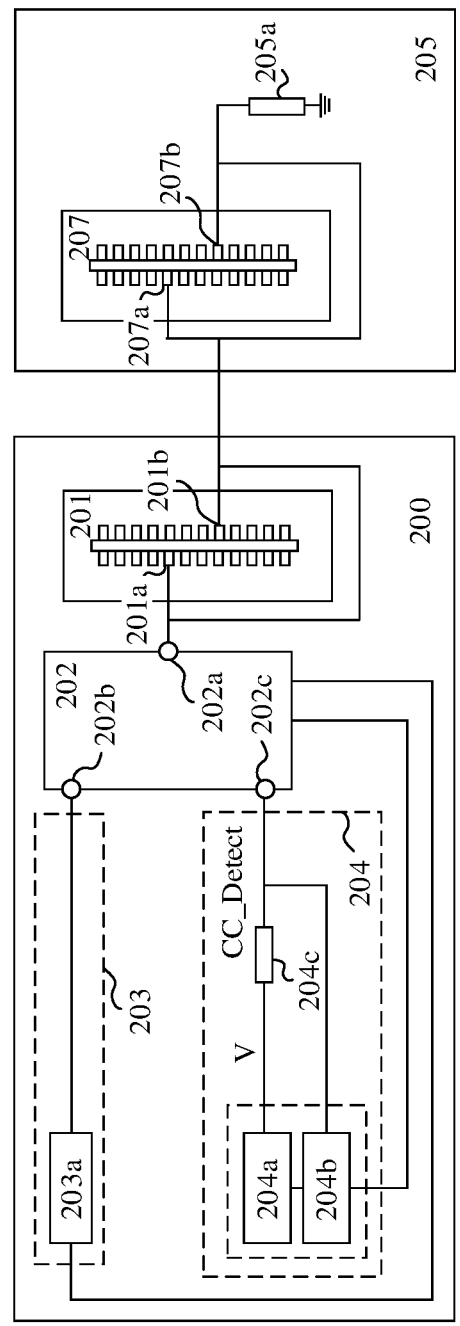
FIG. 3 is a schematic structural diagram of a second circuit according to an embodiment of the present invention.

FIG. 3 is a schematic structural diagram of a second circuit that may be applied to the terminal 100 shown in FIG. 1. As shown in FIG. 3, the electronic device 200 includes a USB Type-C interface 201, a switching circuit 202, a first signal path 203, and a second signal path 204. The USB Type-C interface 201 is configured to connect to a USB Type-C device 205.

In this embodiment of the present invention, the USB Type-C device 205 and the electronic device 200 are connected in a matching manner through a USB Type-C interface 207 and the USB Type-C interface 207. To be compatible with forward insertion and reverse insertion of a USB Type-C interface, upper and lower rows of pins of the USB Type-C interface are symmetrically designed. As shown in FIG. 3, in the USB Type-C interface 201 of the electronic device 200, a first pin 201a and a second pin 201b are symmetrical pins. To be compatible with forward insertion and reverse insertion, the first pin 201a is electrically connected to the second pin 201b. In the USB Type-C interface 207 of the USB Type-C device 207, a first pin 207a and a second pin 207b are symmetrical pins, and the first pin 207a and the second pin 207b may be electrically connected or may not be connected. When the USB Type-C device 205 is connected to the electronic device 200 through the USB Type-C interface 201 and the USB Type-C interface 207, the first pin 201a and the second pin 201b of the USB Type-C interface 201 of the electronic device 200 are electrically connected to the first pin 207a and the second pin 207b of the USB Type-C interface 207 of the USB Type-C device 205.

It may be understood that, in FIG. 3 to FIG. 10, other pins that are included but not shown are electrically connected in a corresponding sequence. Details are not described in this embodiment of the present invention.

A first pin 202a of the switching circuit 202 is connected to the first pin 201a of the USB Type-C interface 201. A second pin 202b of the switching circuit 202 is connected to the first signal path 203. A third pin 202c of the switching circuit 202 is connected to the second signal path 204. The first pin 201a and/or the second pin 201b of the USB Type-C interface 201 may be considered as CC pins/a CC pin of the USB Type-C interface 201. In this embodiment of the present invention, the first pin 207a and/or the second pin 207b of the USB Type-C interface 207 of the USB Type-C device 205 are/is CC pins/a CC pin. The first pin 207a and/or the second pin 207b are/is grounded through a second resistor 205a. Because the USB Type-C device 205 is usually a device with a relatively large resistance value, such as a removable hard disk, a value of the second resistor 205a is generally in a kilo-ohm magnitude. However, in this embodiment of the present invention, a resistance value of the USB Type-C device 205 is not limited.

It should be noted that, in an example in which the terminal 100 is the electronic device 200, a manner of connection between the electronic device 200 and the USB Type-C device 205 is shown in FIG. 3. After the electronic device 200 is connected to the USB Type-C device 205 through the USB Type-C interfaces 201 and 207, the first pin 201a and/or the second pin 201b of the USB Type-C interface 201 of the electronic device 200 are/is electrically connected to the first pin 207a and/or the second pin 207b of the USB Type-C interface 207. In other words, the first pin 201a and/or the second pin 201b of the USB Type-C interface 201 of the electronic device 200 are/is grounded through the second resistor 205a.

Figure 4:
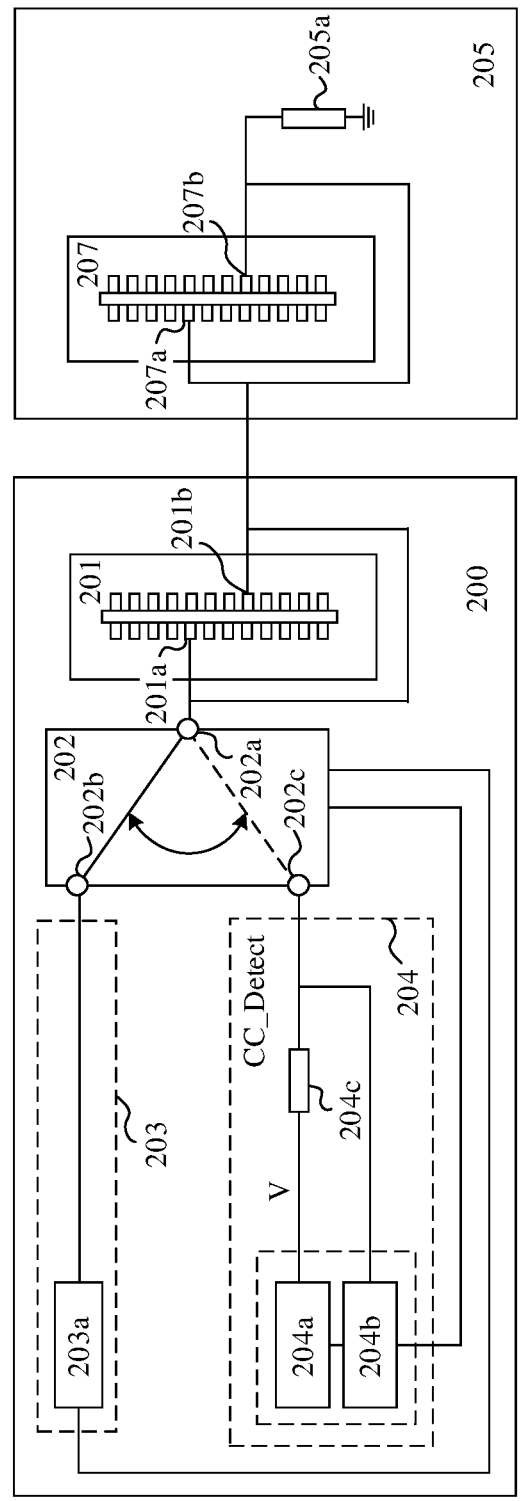
FIG. 4 is a schematic structural diagram of a third circuit according to an embodiment of the present invention.
Figure 5:
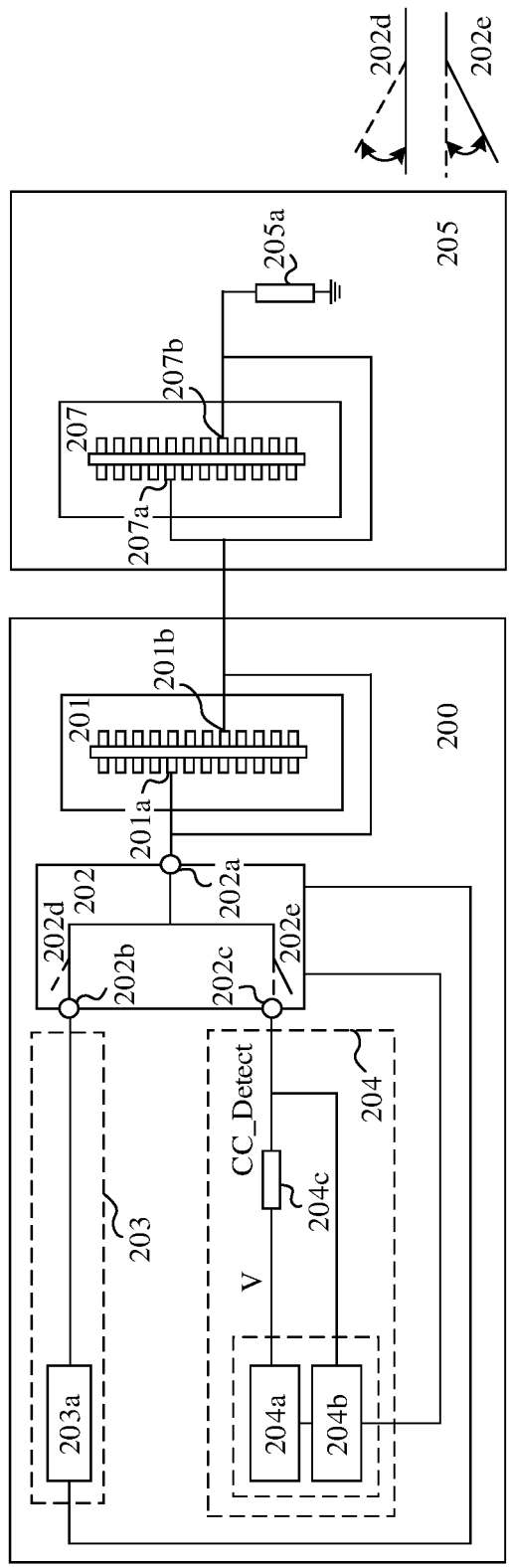
FIG. 5 is a schematic structural diagram of a fourth circuit according to an embodiment of the present invention.

The first pin 201a and the second pin 201b of the USB Type-C interface 201 of the electronic device 200, and the first pin 207a and the second pin 207b of the USB Type-C interface 207 of the USB Type-C device 205 may all be CC pins. The first pin 201a and the second pin 201b of the USB Type-C interface 201 of the electronic device 200 are generally referred to as female connectors. The first pin 207a and the second pin 207b of the USB Type-C interface 207 of the USB Type-C device 205 are generally referred to as male connectors correspondingly. FIG. 4 is a schematic structural diagram of a third circuit that may be applied to the terminal 100 shown in FIG. 1. FIG. 5 is also a schematic structural diagram of a fourth circuit that may be applied to the terminal 100 shown in FIG. 1. A structure of a switching circuit 202 in FIG. 4 is different from a structure of a switching circuit 202 in FIG. 5. To be specific, in this embodiment of the present invention, a switching circuit 202 may be a single-pole double-throw switch, for example, the switching circuit 202 shown in FIG. 4, or may be a combination of two switches, that is, a combination of a switch 202d and a switch 202e, for example, the switching circuit 202 shown in FIG. 5.

It should be noted that the foregoing form of the switching circuit 202 is merely used as a possible structure of the switching circuit 202, and is not used as a limitation on the form of the switching circuit 202. For example, a switching circuit may alternatively be obtained by combining two or more single-pole double-throw switches, or the switching circuit may be obtained by combining a plurality of switches, or the switching circuit may be obtained by combining one or more single-pole double-throw switches and one or more switches. Certainly, the switching circuit may alternatively be another switch in a similar form. This is not limited herein. A person skilled in the art should understand that an implementation form is not limited to the implementation forms in the foregoing examples provided that the switching circuit can implement switching between the first signal path 203 and the second signal path 204. Details are not described herein again.

When the USB Type-C interface 201 is connected to the USB Type-C device 205 through the USB Type-C interface 207, it may be considered that the switching circuit 202 connects the first signal path 203 to the USB Type-C device 205. To be specific, the first pin 202a of the switching circuit 202 may be connected to the second pin 202b of the switching circuit 202. When the USB Type-C interface 201 is disconnected from the USB Type-C device 205, it may be considered that the switching circuit 202 connects the second signal path 204 to the USB Type-C interface 201. To be specific, the first pin 202a of the switching circuit 202 may be connected to the third pin 202c of the switching circuit 202.

When the first pin 202a of the switching circuit 202 is connected to the second pin 202b of the switching circuit 202, a level of the first pin 201a of the USB Type-C interface 201 is a first level. When the first pin 202a of the switching circuit 202 is connected to the third pin 202c of the switching circuit 202, a level of the first pin 201a of the USB Type-C interface 201 is a second level. The first level is greater than the second level.

In this embodiment of the present invention, the first level may be considered as a pulse signal. In other words, the first level is in a state in which a high level and a low level alternately translate, and the state is the same as an actual level state of a current CC pin. Generally, the high level is greater than 2.8 V, and a duty cycle of the first level is between 30% and 70%. The second level, namely, a CC_Detect voltage value, may be set to a constant voltage value, and the CC_Detect voltage value is generally set to be less than 1V. Description of a level value in this embodiment of the present invention is merely an example, to facilitate understanding of this solution. The foregoing descriptions are merely specific implementations of the present invention, but are not intended to limit the protection scope of the present invention.

In this embodiment of the present invention, the first signal path 203 includes a PD circuit 203a, and the second signal path 204 includes a power supply module 204a, a detection module 204b, and a first resistor 204c.

The PD circuit 203a may be a PD chip. The power supply module 204a is configured to output first power, and is connected to the third pin 202c of the switching circuit 202 through the first resistor 204c. In addition, the power supply module 204a may further provide a voltage source for the switching circuit 202, and provide a voltage source for the PD circuit 203a. The detection module 204b may be configured to detect a level of the third pin 202c of the switching circuit 202, or may be considered as a voltage between the third pin 202c of the switching circuit 202 and the first resistor 204c. A level of the first power is less than a level of a signal output by the PD circuit 203a.

In this embodiment of the present invention, the power supply module 204a and the detection module 204b may be integrated and jointly implemented as a power management unit (Power Management Unit, PMU). The detection module 204b may be an analog-to-digital converter (Analog-to-Digital Converter, ADC) detection module.

In this embodiment of the present invention, a value of the first resistor 204c used as a voltage divider resistor may be in a kilo-ohm (Kohm) magnitude or a mega-ohm (Mohm) magnitude. This is not limited herein. In addition, after the USB Type-C interface 201 is connected to the USB Type-C device 205, and the first pin 202a of the switching circuit 202 is connected to the third pin 203c of the switching circuit 202, a larger value of the first resistor 204c indicates a smaller value of a voltage between the first resistor 204c and the third pin 202c of the switching circuit 202, and also means a smaller level of the third pin 202c of the switching circuit 202, namely a smaller CC_Detect voltage value, which is closer to 0.

Figure 6:
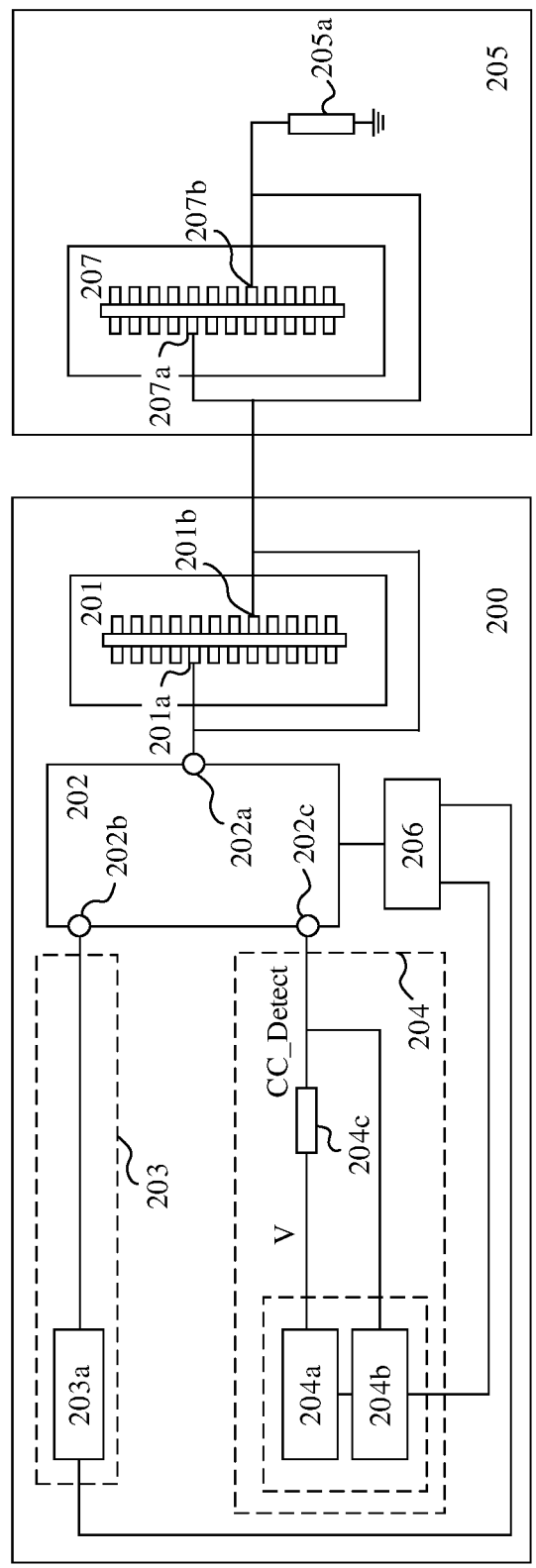
FIG. 6 is a schematic structural diagram of a fifth circuit according to an embodiment of the present invention.

FIG. 6 is a schematic structural diagram of a fifth circuit that may be applied to the terminal 100 shown in FIG. 1. As shown in FIG. 6, the electronic device 200 further includes a controller 206. The controller 206 is connected to a detection module 204b and a switching circuit 202. In this embodiment of the present invention, the controller 206 may be a mobile phone system on chip (System on chip, SOC). It should be noted that a power supply module 204a may also serve as a voltage source of the controller 206 to supply power to the controller 206, that is, provide a voltage for the controller 206.

The detection module 204b is further configured to send a first signal to the controller 206 when a detected level of a third pin 202c of the switching circuit 202 meets a first preset condition. Then the controller 206 instructs, based on the first signal, a first pin 202a of the switching circuit 202 to connect to a second pin 202b of the switching circuit 202.

Alternatively, the detection module 204b sends the detected level of the third pin 202c of the switching circuit 202 to the controller 206. Then the controller 206 instructs, based on the level of the third pin 202c of the switching circuit 202, the first pin 202a of the switching circuit 202 to connect to the second pin 202b of the switching circuit 202.

It should be noted that, after detecting a level of the third pin 202c of the switching circuit 202 and determining that the level meets the first preset condition, the detection module 204b may directly send the first signal to the switching circuit 202, and then the switching circuit 202 switches connections between the pins in response to the first signal. Alternatively, the detection module 204b directly sends the detected level of the third pin 202c to the switching circuit 202, and then the switching circuit 202 may directly switch the connections between the pins based on the level.

In addition, switching of the connections between the pins of the switching circuit 202 may be considered as an implementation in which the switching circuit 202 connects a first signal path 203 or a second signal path 204 to a USB Type-C interface, and is not intended to limit this embodiment of the present invention.

In this embodiment of the present invention, when the level of the third pin 202c of the switching circuit 202 meets the first preset condition, it may be determined that the electronic device 200 is connected to a USB Type-C device 205. In other words, for the detection module 204b, the switching circuit 202, and the controller 206, when it is determined that the level of the third pin 202c meets the first preset condition, it may be determined that the electronic device 200 is connected to the USB Type-C device 205, thereby triggering the switching circuit 202 to switch the connections between the pins.

The first signal may be an interrupt (Interrupt, INT) signal, but is not limited to the INT signal. A message that the controller 206 instructs the switching circuit 202 to connect two pins may be a general purpose input output (General Purpose Input Output, GPIO) signal, but is not limited to the GPIO signal.

The first preset condition is used to determine whether the detection module 204b needs to send the first signal to the controller 206, and includes but is not limited to at least one of the following: a level decrease value of the third pin 202c of the switching circuit 202 is greater than a first voltage threshold; and the level of the third pin 202c of the switching circuit 202 is less than a second voltage threshold, or falls within a preset threshold range. In this embodiment of the present invention, values of the first voltage threshold and the second voltage threshold, and upper and lower limits of the preset threshold range may be set based on historical empirical values. A setting manner, a specified value, and the like are not limited herein.

It can be learned that the detection module 204b may connect, through the controller 206, the first pin 202a of the switching circuit 202 to the second pin 202b of the switching circuit 202 in a plurality of implementations, which are not limited to the foregoing two examples, provided that it is ensured that a connection in the switching circuit 202 can be switched after the level of the third pin 202c of the switching circuit 202 meets the first preset condition. An implementation is not limited herein.

It should be noted that the controller 206 may be further configured to: when a PD circuit 203a detects that the USB Type-C device 205 connected to the USB Type-C interface 201 is disconnected, after receiving a second signal sent by the PD circuit 203a, the controller 206 may instruct, based on the second signal, the first pin 202a of the switching circuit 202 to connect to the third pin 202c of the switching circuit 202.

Similarly, when detecting that the USB Type-C device 205 connected to the USB Type-C interface 201 is disconnected, the PD circuit 203a may also directly send the second signal to the switching circuit 202, and then the switching circuit 202 switches the connections between the pins in response to the second signal.

In this embodiment of the present invention, that the PD circuit 203a detects that the USB Type-C device 205 connected to the USB Type-C interface 201 is disconnected includes but is not limited to: the PD circuit 203a detects that a voltage between the PD circuit 203a and the second pin 202b of the switching circuit 202 meets a second preset condition.

The second preset condition includes but is not limited to at least one of the following: a level of the second pin 202b of the switching circuit 202 increases or decreases, and a change value is greater than a third voltage threshold; the level of the second pin 202b of the switching circuit 202 is greater than a fourth voltage threshold; and the level of the second pin 202b of the switching circuit 202 is less than a fifth voltage threshold. The fourth voltage threshold is greater than the fifth voltage threshold.

Values of the third voltage threshold, the fourth voltage threshold, and the fifth voltage threshold may be set based on historical empirical values. A setting manner and a specified value are not limited herein.

It should be noted that, after the USB Type-C interface 201 is connected to the USB Type-C device 205, the first signal path 203 is connected, and the second signal path 204 is disconnected, the second pin 202b of the switching circuit 202 is in a level state of a constant voltage. In this case, if the USB Type-C interface 201 is disconnected from the USB Type-C device 205, the PD circuit 203a detects that a voltage of the second pin 202b of the switching circuit 202 changes.

It should be noted that, for an implementation in which the PD circuit 203a detects that the USB Type-C device 205 connected to the USB Type-C interface 201 is disconnected, refer to an implementation in the prior art. This is not specifically limited in the present invention.

In addition, the controller 206 controls by default the third pin 202c of the switching circuit 202 to connect to the first pin 202a of the switching circuit 202. To be specific, before no USB Type-C device 205 is connected to the USB Type-C interface 201 of the electronic device 200, a level of a first pin 201a of the USB Type-C interface 201 remains at a relatively low voltage value. In this way, corrosion of the USB Type-C interface 201 is reduced after liquid enters the USB Type-C interface 201.

Figure 7:
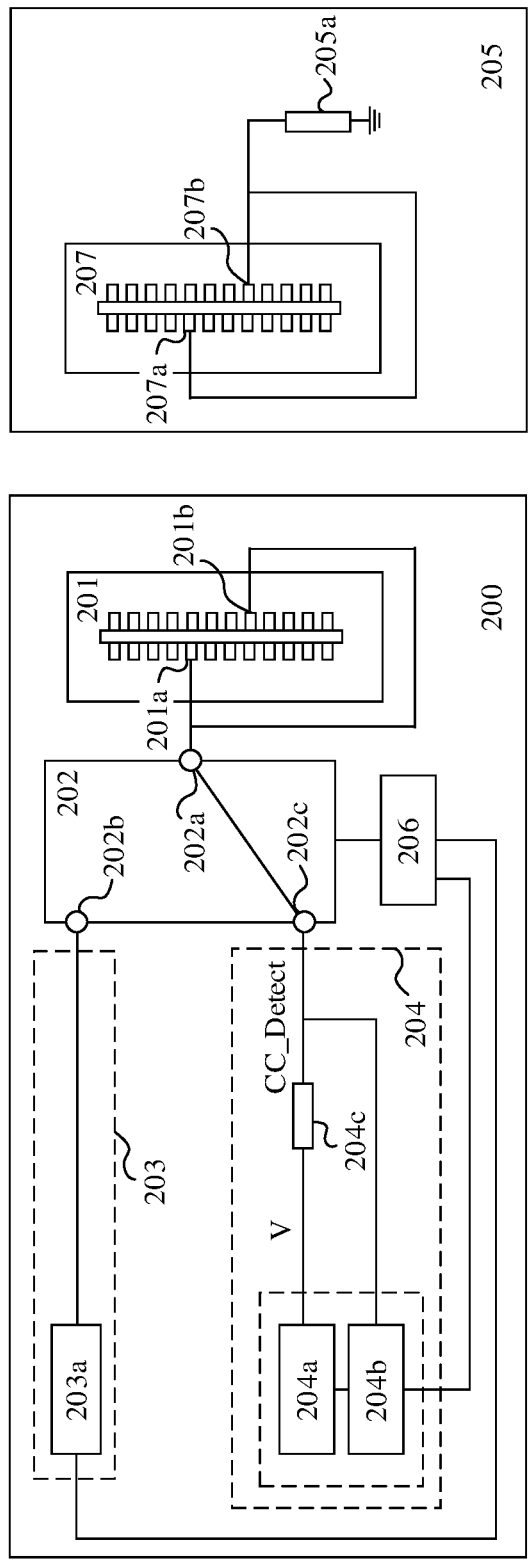
FIG. 7 is a schematic structural diagram of a sixth circuit according to an embodiment of the present invention.

For example, FIG. 7 is a schematic structural diagram of a sixth circuit that may be applied to the terminal boo shown in FIG. 1. The circuit shown in FIG. 7 is used as an example, and is a case in which the electronic device 200 is not connected to any USB Type-C device 205. A switching circuit 202 uses a single-pole double-throw switch, and currently, a first pin 202a of the switching circuit 202 is connected to a third pin 202c of the switching circuit 202. In this case, a level of a first pin 201a of a USB Type-C interface 201 is a second level.

Figure 8:
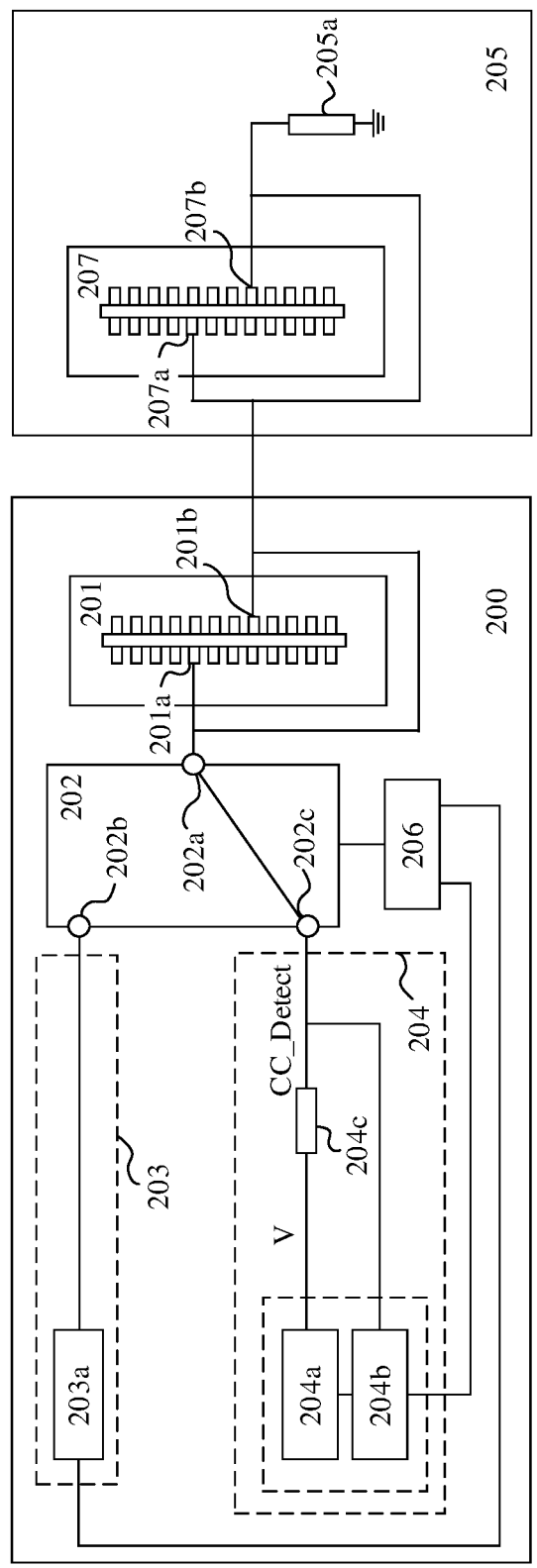
FIG. 8 is a schematic structural diagram of a seventh circuit according to an embodiment of the present invention.
Figure 9:
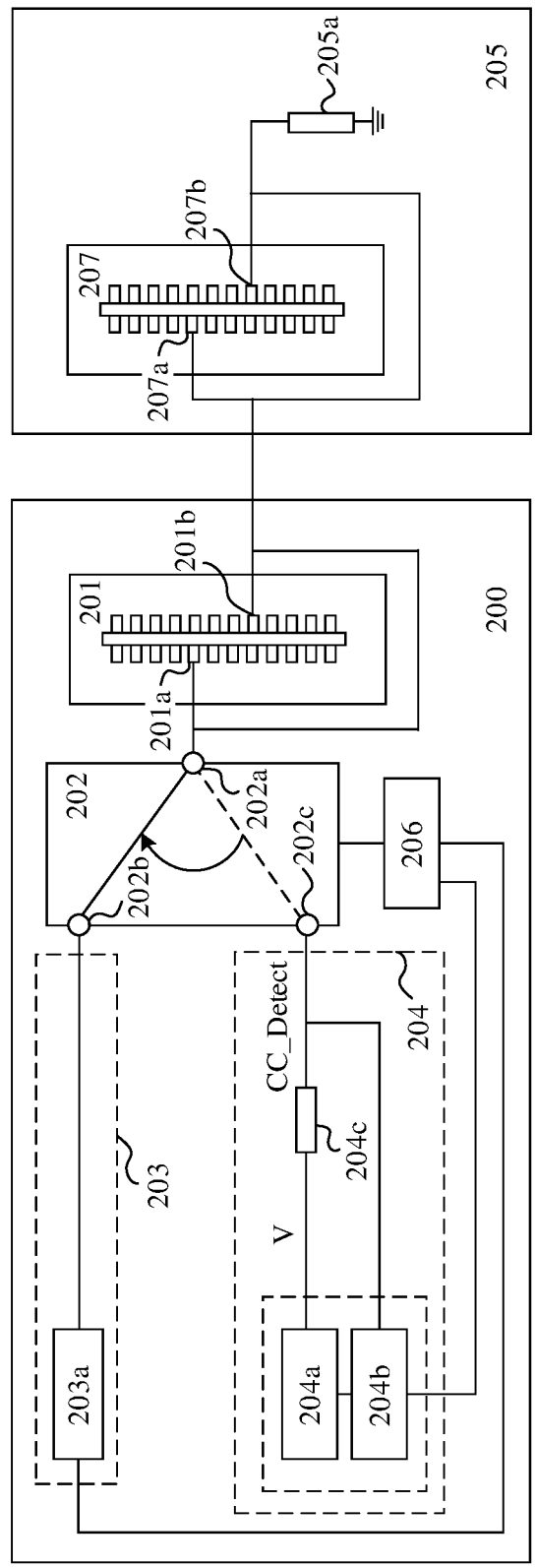
FIG. 9 is a schematic structural diagram of an eighth circuit according to an embodiment of the present invention.

FIG. 8 is a schematic structural diagram of a seventh circuit that may be applied to the terminal 100 shown in FIG. 1. As shown in FIG. 8, the electronic device 200 is connected to a USB Type-C device 205 and the electronic device 200 does not identify a circuit connection when the USB Type-C device 205 is inserted. A third pin 202c of a switching circuit 202 is electrically connected to the third pin 202a of the switching circuit 202. The third pin 202a of the switching circuit 202 is electrically connected to a first pin 207a of a USB Type-C interface 207 of the USB Type-C device 205 through a USB Type-C interface 201. The first pin 207a is grounded through a second resistor 205a. Therefore, when the electronic device 200 is connected to the USB Type-C device 205, a CC_Detect voltage value is a voltage division value of the second resistor 205a and a first resistor 204c on V. To be specific, if the CC_Detect voltage value decreases from V to (V×R205a/(R205a+R204c)), a CC_Detect voltage value detected by a detection module 204b changes, that is, a current CC_Detect voltage value is less than a voltage value of V output by a power supply module 204a, and the CC_Detect voltage value is likely to be close to 0. After a CC_Detect voltage decrease value is greater than a first voltage threshold, or the CC_Detect voltage value is less than a second voltage threshold, the detection module 204b determines that the electronic device 200 is currently connected to the USB Type-C device 205. In this case, the detection module 204b sends a first signal to a controller 206, to inform the controller 206 that the USB Type-C interface 201 of the electronic device 200 is connected to the USB Type-C device 205, and a path between a PD circuit 203a and the USB Type-C device 205 needs to be established by changing connections between the pins of the switching circuit 202, so that the PD circuit 203a identifies a type of the USB Type-C device 205. Then the controller 206 sends the first signal to the switching circuit 202, so that the first pin 202a of the switching circuit 202 is disconnected from the third pin 202c of the switching circuit 202, and the first pin 202a of the switching circuit 202 is connected to a second pin 202b of the switching circuit 202, thereby obtaining a circuit structure shown in FIG. 9. FIG. 9 is a schematic structural diagram of an eighth circuit that may be applied to the terminal 100 shown in FIG. 1. In this case, the PD circuit 203a can directly identify the type of the USB Type-C device 205.

Figure 10:
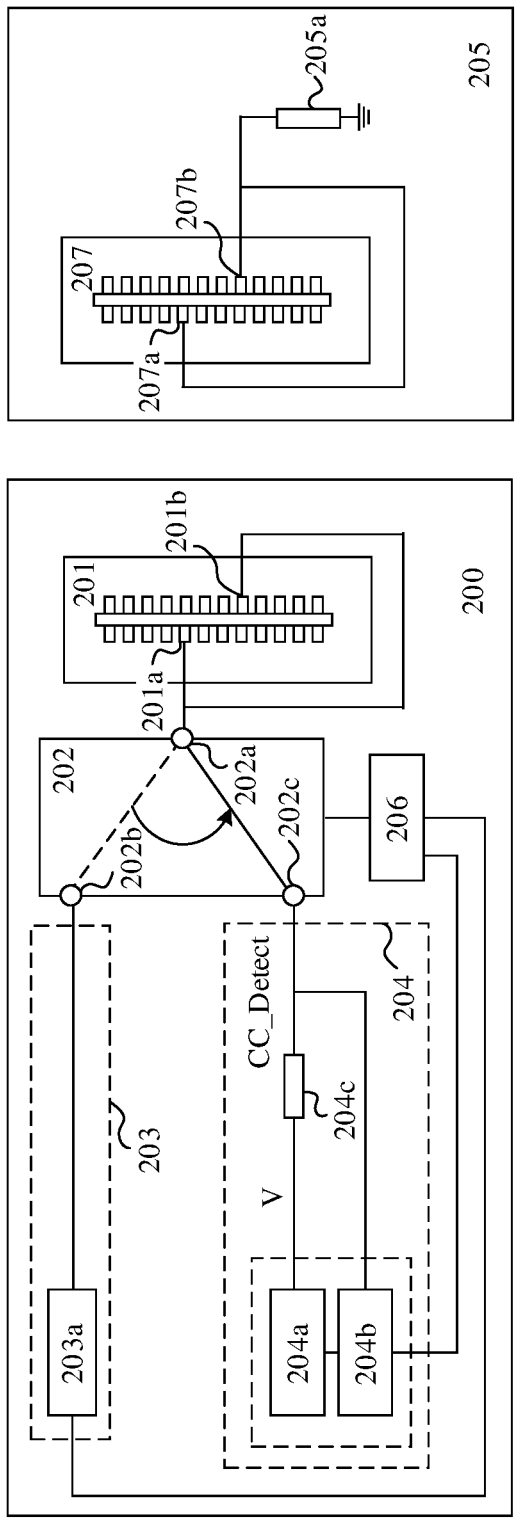
FIG. 10 is a schematic structural diagram of a ninth circuit according to an embodiment of the present invention.

FIG. 10 is a schematic structural diagram of a ninth circuit that may be applied to the terminal 100 shown in FIG. 1. As shown in FIG. 10, when the electronic device 200 is disconnected from a USB Type-C device 205, after detecting that a level of a second pin 202b of a switching circuit 202 increases or decreases, and a change value is greater than a third voltage threshold, or detecting that the level of the second pin 202b of the switching circuit 202 is greater than a fourth voltage threshold, or detecting that the level of the second pin 202b of the switching circuit 202 is less than a fifth voltage threshold, a PD circuit 203a determines that the USB Type-C device 205 currently connected to the electronic device 200 is removed. In this case, the PD circuit 203a sends a second signal to a controller 206 to inform the controller 206 that a USB Type-C interface 201 of the electronic device 200 is disconnected to the USB Type-C device 205, a first pin 202a of the switching circuit 202 needs to be disconnected from a second pin 202b of the switching circuit 202, and the first pin 202a of the switching circuit 202 needs to be connected to a third pin 202c of the switching circuit 202. In other words, a first signal path 203 between the PD circuit 203a and the first pin 202a of the switching circuit 202 is disconnected, so that a CC_Detect pin of the USB Type-C interface 201 is connected to a second signal path 204. Then, the controller 206 instructs the switching circuit 202 to switch connections between the pins.

In this case, a CC_Detect level value is a level value V output by a power supply module 204a, and a level value of a first pin 201a of the USB Type-C interface 201 is also V. V is less than a high level value of a pulse signal output by the PD circuit 203a, and is a relatively low level value. Therefore, corrosion of the USB Type-C interface 201 can be effectively reduced.

It should be noted that, the PD circuit outputs a pulse signal, and a voltage value of V may be set to be less than a high level value of the pulse signal output by the PD circuit. The value may be set as a voltage threshold based on a historical empirical value. In this embodiment of the present invention, a voltage value greater than or equal to the voltage threshold may be considered as a voltage value that causes excessively fast corrosion of the USB Type-C interface 201, and a voltage value less than the voltage threshold is considered as a voltage value that causes relatively small corrosion of the USB Type-C interface 201. In this embodiment of the present invention, after a voltage value of the USB Type-C interface 201 is reduced to 1V (volt), an electrolytic reaction of the USB Type-C interface 201 is extremely weak. Therefore, the voltage threshold may be set to 1V. A specific manner of setting the voltage threshold is not limited herein, and the foregoing parameters are merely used as a possible example.

It should be noted that, if the switching circuit 202 is the switching circuit 202 shown in FIG. 5, that is, includes the switch 202d and the switch 202e, in an actual use process, at a same moment, one of the switch 202d and the switch 202e may be in a closed state, and the other may be in a non-closed state. Certainly, when state switching is performed between the switch 202d and the switch 202e, both the switch 202d and the switch 202e may be in a non-closed state.

Figure 11:
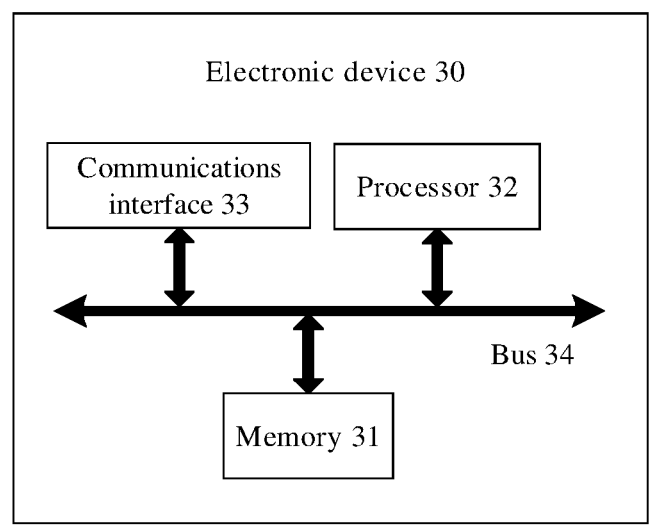
FIG. 11 is a schematic structural diagram of an electronic device according to an embodiment of the present invention.

FIG. 11 is a schematic structural diagram of a possible implementation of the terminal 100 shown in FIG. 1. An embodiment of the present invention provides an electronic device 30 having a USB Type-C interface. As shown in FIG. 11, the electronic device 30 includes any one of the circuits shown in FIG. 3 to FIG. 10.

The electronic device 30 further includes a memory 31, one or more processors 32, a plurality of applications, and one or more programs. The one or more programs are stored in the memory. When the one or more programs are executed by the one or more processors, the electronic device 30 is enabled to implement the foregoing method steps.

In addition, the electronic device 30 may further include a communications interface 33 and a bus 34. The memory 31, the processor 32, and the communications interface 33 are connected to each other through the bus 34. The bus 34 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. ii, but this does not mean that there is only one bus or only one type of bus.

The processor 32 may be a central processing unit (Central Processing Unit, CPU), a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a transistor logic device, a hardware component, or any combination thereof. The processor may implement or execute various example logical blocks and circuits described with reference to content disclosed in the embodiments of the present invention. The processor may alternatively be a combination of computing functions, for example, a combination of one or more microprocessors or a combination of a DSP and a microprocessor.

In the embodiments of the present invention, VDD may represent a power supply, and may alternatively represent a level value of the power supply. R may represent a resistor in a circuit, and may alternatively represent a resistance value of the resistor. R205a and R204c may represent resistors 205a and 204c in the circuit, and may alternatively represent resistance values of the resistors 205a and 204c.

Methods or algorithm steps described in combination with the content disclosed in the embodiments of the present invention may be implemented by hardware, or may be implemented by a processor by executing a software instruction. The software instruction may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (Compact Disc Read-Only Memory, CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be deployed in a same device, or the processor and the storage medium may be deployed in different devices as discrete components.

The objectives, technical solutions, and beneficial effects of the embodiments of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the embodiments of the present invention shall fall within the protection scope of the embodiments of the present invention.

What is claimed is:

1. A device, comprising:
a USB Type-C interface configured to connect to a USB Type-C device;
a switching circuit connected to the USB Type-C interface, a first signal path, and a second signal path;
wherein when the USB Type-C interface is connected to the USB Type-C device, the first signal path is connected to the USB Type-C interface through the switching circuit, the second signal path is disconnected from the USB Type-C interface, and a level of a first pin of the USB Type-C interface is a first level;
wherein when the USB Type-C interface is disconnected from the USB Type-C device, the second signal path is connected to the USB Type-C interface through the switching circuit, the first signal path is disconnected from the USB Type-C interface, and a level of the first pin of the USB Type-C interface is a second level; and
wherein the first level is greater than the second level.

2. The device of claim 1, wherein the first pin of the USB Type-C interface is a CC pin.

3. The device of claim 1, wherein:
the first signal path comprises a PD circuit;
the second signal path comprises a power supply circuit, a detection circuit, and a first resistor;
the power supply circuit is configured to output a first power, the power supply circuit is connected to a third pin of the switching circuit through the first resistor, and a level of the first power is less than a level of a signal output by the PD circuit; and
the detection circuit is configured to detect a level of the third pin of the switching circuit, and when the level of the third pin meets a first preset condition, determine that the USB Type-C interface is connected to the USB Type-C device and send a first signal to the switching circuit, wherein the first signal instructs connecting the first signal path with the USB Type-C interface.

4. The device of claim 3, wherein:
the PD circuit is configured to detect a level of a second pin of the switching circuit; and
in response to the level of the second pin meeting a second preset condition, determine that the USB Type-C interface is disconnected from the USB Type-C device and send a second signal to the switching circuit, wherein the second signal instructs connecting the second signal path with the USB Type-C interface.

5. The device of claim 3, wherein:
the device further comprises a controller, the controller is connected to the detection circuit and the switching circuit;
the detection circuit is further configured to send a first signal to the controller when the level of the third pin of the switching circuit meets the first preset condition; and
the controller instructs, according to the first signal, the switching circuit to connect the first signal path to the USB Type-C interface.

6. The device of claim 3, wherein the device further comprises:
a controller, the controller is connected to the detection circuit and the switching circuit;
the detection circuit sends the level of the third pin of the switching circuit to the controller; and
the controller instructs, according to the level of the third pin of the switching circuit, the switching circuit to connect the first signal path to the USB Type-C interface.

7. The device of claim 4, wherein:
the device further comprises a controller, the controller is connected to the PD circuit and the switching circuit; and
the controller instructs, according to the second signal, the switching circuit to connect the second signal path to the USB Type-C interface.

8. The device of claim 3, wherein the detection circuit is an analog-to-digital converter (ADC) detection circuit.

9. A method comprising:
connecting a first signal path to a USB Type-C interface through a switching circuit when the USB Type-C interface is connected with a USB Type-C device, the switching circuit is connected to the USB Type-C interface, the first signal path, and a second signal path;
disconnecting the second signal path from the USB Type-C interface when the USB Type-C interface is connected with the USB Type-C device, wherein a level of a first pin of the USB Type-C interface is a first level when the USB Type-C interface is connected with the USB Type-C device;
connecting the second signal path to the USB Type-C interface through the switching circuit when the USB Type-C interface is disconnected with the USB Type-C device; and
disconnecting the first signal path from the USB Type-C interface when the USB Type-C interface is disconnected with the USB Type-C device, wherein a level of the first pin of the USB Type-C interface is a second level when the USB Type-C interface disconnected with the USB Type-C device, wherein the first level is greater than the second level.

10. The method of claim 9, wherein the first pin of the USB Type-C interface is a CC pin.

11. The method of claim 9, wherein the first signal path comprises a PD circuit, and wherein the method further comprises:

detecting, by the PD circuit, that a level of a second pin of the switching circuit meets a second preset condition;
determining, by the PD circuit, that the USB Type-C interface is disconnected from the USB Type-C device;
controlling the switching circuit to disconnect the first signal path from the USB Type-C interface; and
controlling the switching circuit to connect the second signal path to the USB Type-C interface.

12. The method of claim 9, wherein the second signal path comprises a power supply circuit, a detection circuit, and a first resistor, and wherein the method further comprises:
detecting, by the detection circuit, that a level of a third pin of the switching circuit meets a first preset condition;
determining, by the detection circuit, that the USB Type-C interface is connected to the USB Type-C device according to the level of the third pin of the switching circuit meeting the first preset condition;
controlling the switching circuit to disconnect the second signal path from the USB Type-C interface, and
controlling the switching circuit to connect the first signal path to the USB Type-C interface.

13. The method of claim 11, wherein the device comprises a controller, and wherein the method further comprises:
detecting, by the PD circuit, that the level of the second pin of the switching circuit meets the second preset condition;
determining, by the PD circuit, that the USB Type-C interface is disconnected from the USB Type-C device according to the level of the second pin of the switching circuit meeting the second preset condition;
controlling, by the controller, according to an instruction from the PD circuit, the switching circuit to disconnect the first signal path from the USB Type-C interface; and
controlling, by the controller, according to an instruction from the PD circuit, the switching circuit to connect the second signal path to the USB Type-C interface.

14. The method of claim 12, wherein the device comprises a controller, and wherein the method further comprises:
detecting, by the detection circuit, that the level of the third pin of the switching circuit meets the first preset condition;
determining, by the detection circuit, that the USB Type-C interface is connected to the USB Type-C device;
controlling, by the controller, according to an instruction from the detection circuit, the switching circuit to disconnect the second signal path from the USB Type-C interface; and
controlling, by the controller, according to an instruction from the detection circuit, the switching circuit to connect the first signal path to the USB Type-C interface.

15. A non-transitory computer-readable medium having processor-executable instructions stored thereon, wherein the processor-executable instructions, when executed, facilitate:
connecting a first signal path to a USB Type-C interface through a switching circuit when the USB Type-C interface is connected with a USB Type-C device;
disconnecting a second signal path from the USB Type-C interface when the USB Type-C interface is connected with the USB Type-C device, wherein a level of a first pin of the USB Type-C interface is a first level when the USB Type-C interface connected with the USB Type-C device;

connecting a second signal path to the USB Type-C interface through a switching circuit when the USB Type-C interface is disconnected with the USB Type-C device; and disconnecting the first signal path from the USB Type-C interface when the USB Type-C interface is disconnected with the USB Type-C device, wherein a level of the first pin of the USB Type-C interface is a second level when the USB Type-C interface disconnected with the USB Type-C device, wherein the first level is greater than the second level.

16. The non-transitory computer-readable medium of claim 15, wherein the first pin of the USB Type-C interface is a CC pin.

17. The non-transitory computer-readable medium of claim 15, wherein the processor-executable instructions, when executed, further facilitate:
    detecting, by a PD circuit, that a level of a second pin of the switching circuit meets a second preset condition;
    determining, by the PD circuit, that the USB Type-C interface is disconnected from the USB Type-C device;
    controlling the switching circuit to disconnect the first signal path from the USB Type-C interface; and
    controlling the switching circuit to connect the second signal path to the USB Type-C interface.

18. The non-transitory computer-readable medium of claim 15, wherein the second signal path comprises a power supply circuit, a detection circuit, and a first resistor, wherein the processor-executable instructions, when executed, further facilitate:
    detecting, by the detection circuit, that a level of a third pin of the switching circuit meets a first preset condition;
    determining, by the detection circuit, that the USB Type-C interface is connected to the USB Type-C device according to the level of the third pin of the switching circuit meets the first preset condition;
    controlling the switching circuit to disconnect the second signal path from the USB Type-C interface, and controlling the switching circuit to connect the first signal path to the USB Type-C interface.

19. The non-transitory computer-readable medium of claim 18, wherein the device comprises a controller, wherein the processor-executable instructions, when executed, further facilitate:
    detecting, by a PD circuit, that the level of the second pin of the switching circuit meets a second preset condition;
    determining, by the PD circuit, that the USB Type-C interface is disconnected from the USB Type-C device according to the level of the second pin of the switching circuit meeting the second preset condition;
    controlling, by the controller, according to an instruction from the PD circuit, the switching circuit to disconnect the first signal path from the USB Type-C interface; and
    controlling, by the controller, according to an instruction from the PD circuit, the switching circuit to connect the second signal path to the USB Type-C interface.

20. The non-transitory computer-readable medium of claim 18, wherein the device comprises a controller, wherein the processor-executable instructions, when executed, further facilitate:
    detecting, by a detection circuit, that the level of the third pin of the switching circuit meets the first preset condition;
    determining, by the detection circuit, that the USB Type-C interface is connected to the USB Type-C device;
    controlling, by the controller, according to an instruction from the detection circuit, the switching circuit to disconnect the second signal path from the USB Type-C interface; an
    controlling, by the controller, according to an instruction from the detection circuit, the switching circuit to connect the first signal path to the USB Type-C interface.

* * * * *